Aug. 29, 1950 C. D. KEITH ET AL 2,520,727
TRANSFER MACHINE FOR BOTTLES AND LIKE ARTICLES
Filed April 19, 1946 9 Sheets-Sheet 3
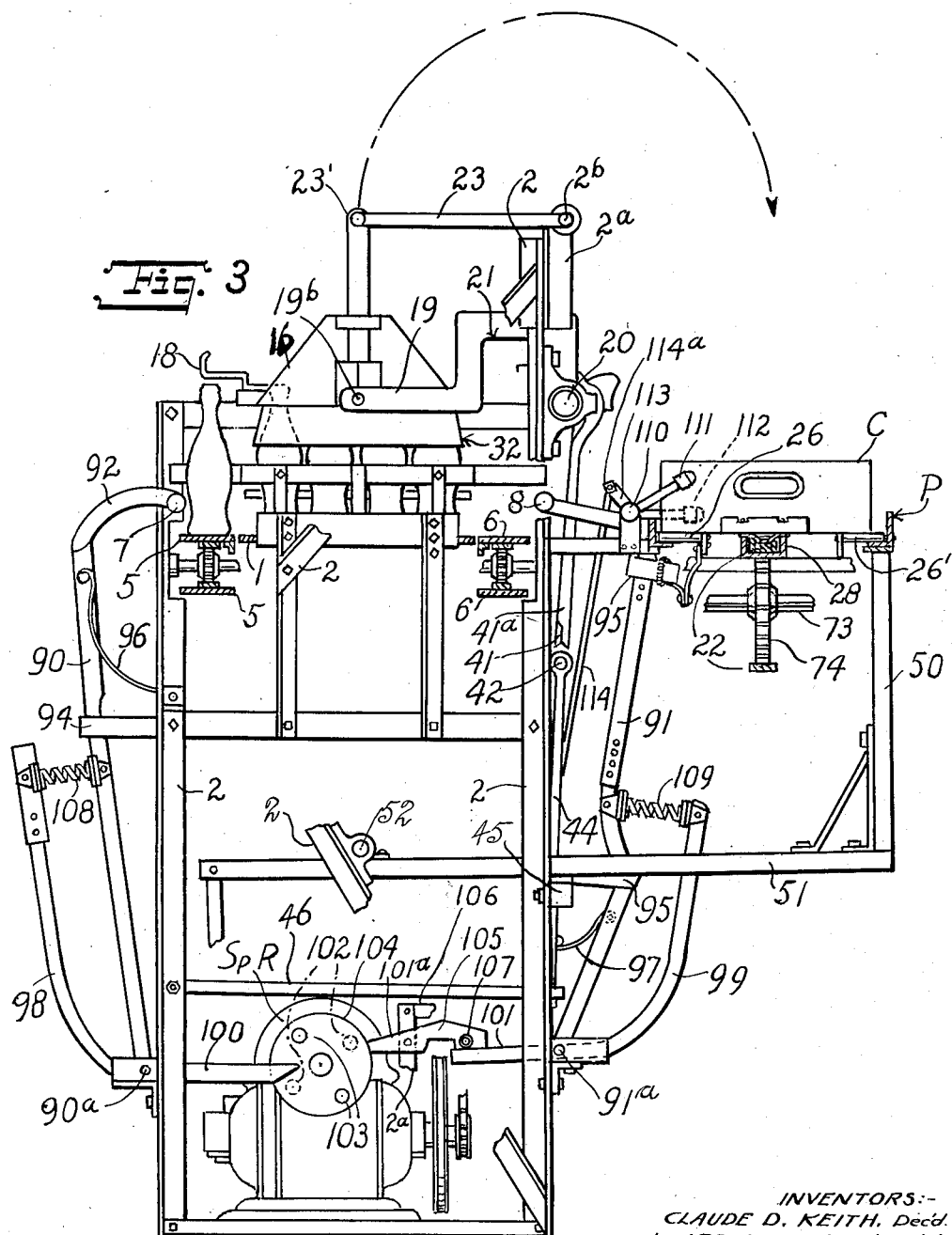
INVENTORS:-
CLAUDE D. KEITH, Dec'd.
by IRENE M. KEITH, Adm'x.
JOSEPH F. O'BRIEN.
AND SOREN MADSEN
BY
Joseph F. O'Brien
Attorney

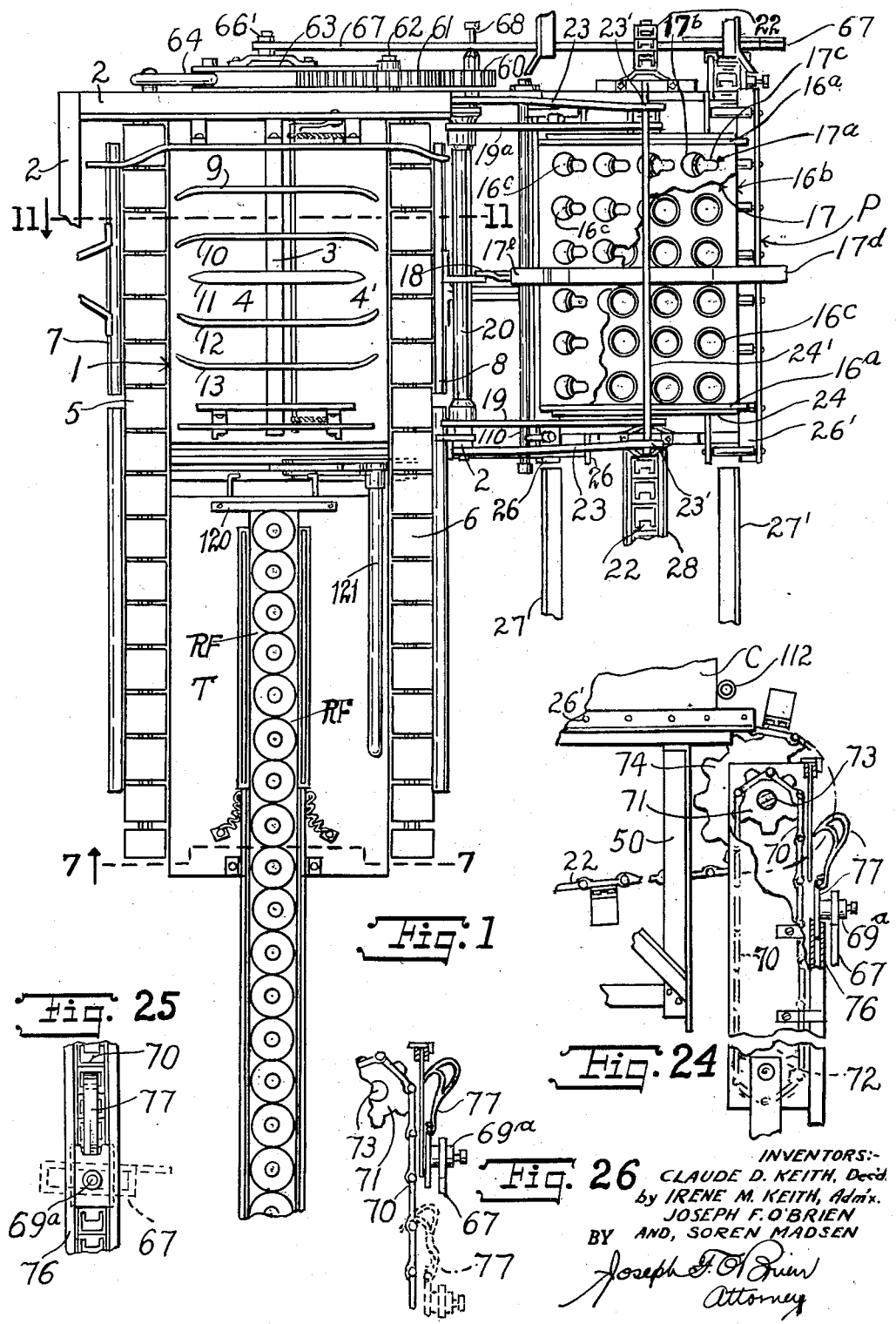

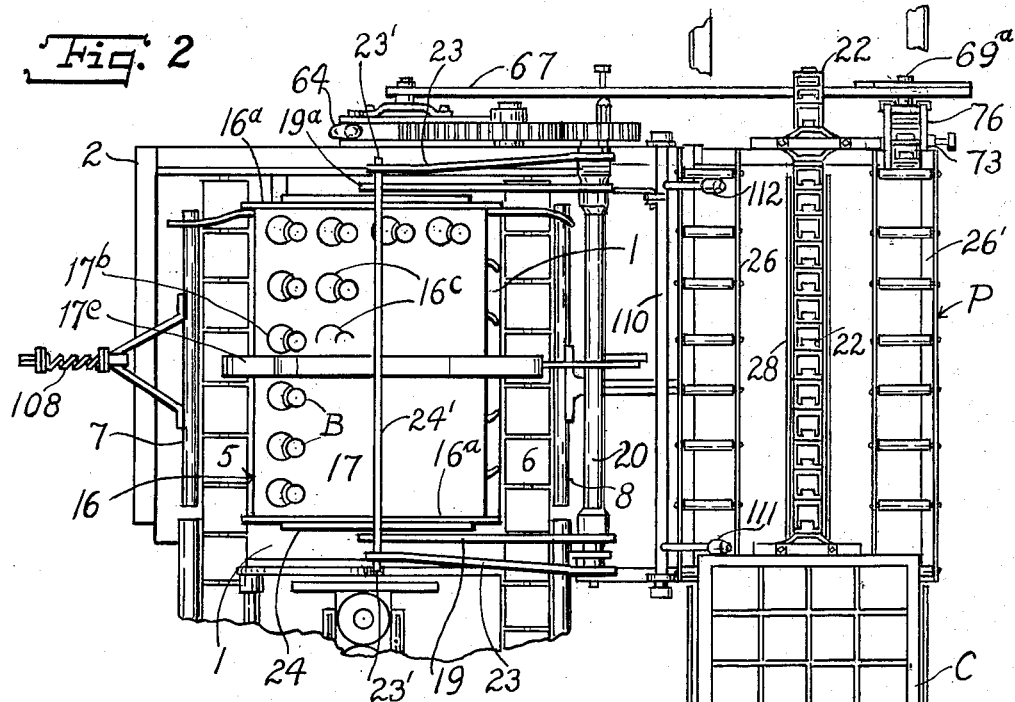
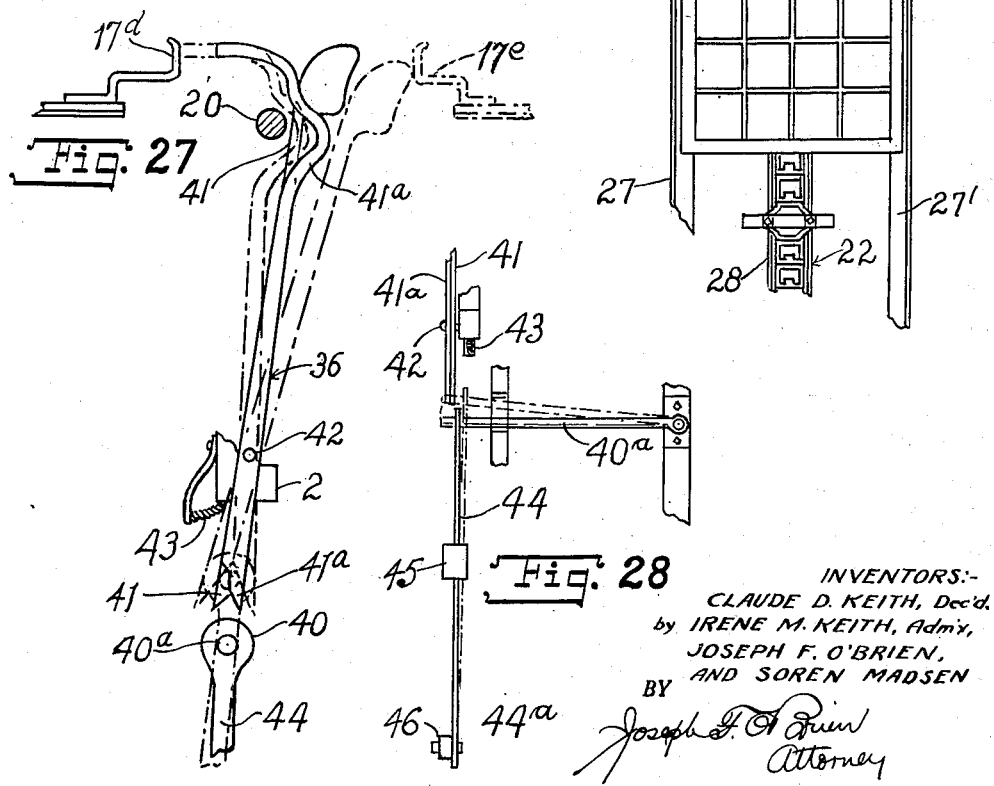

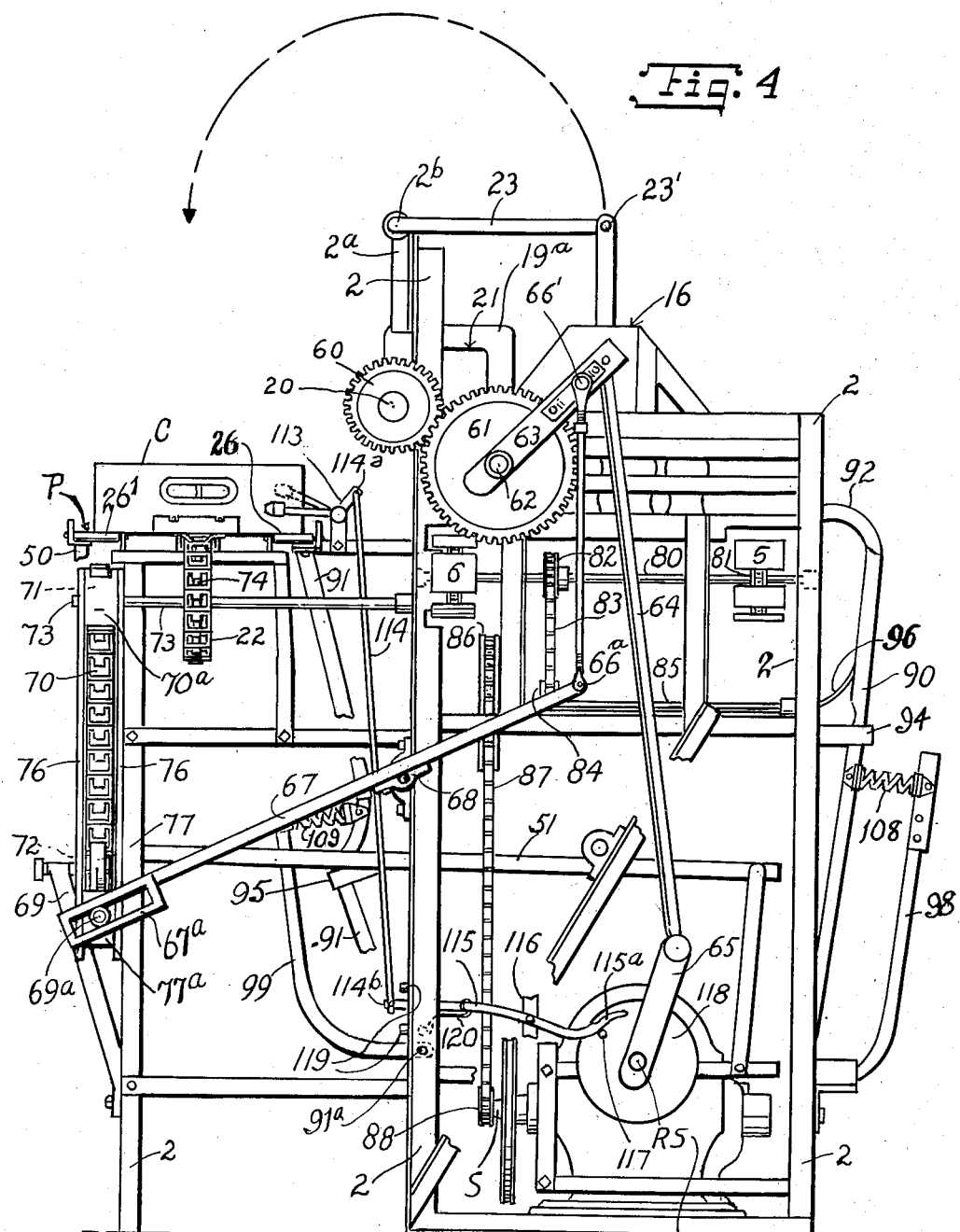

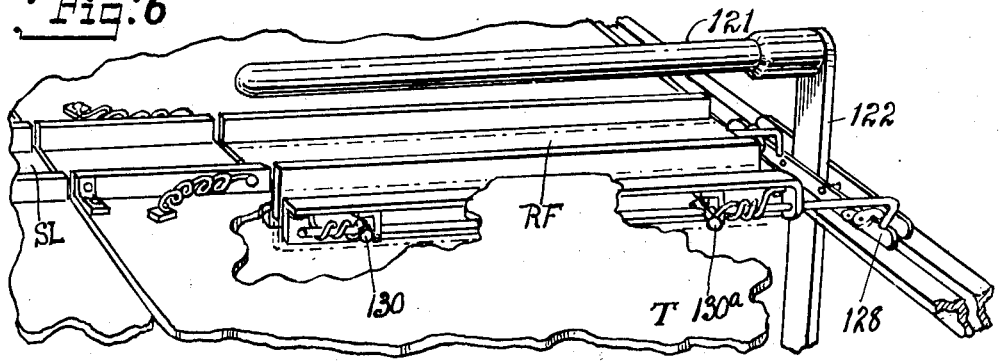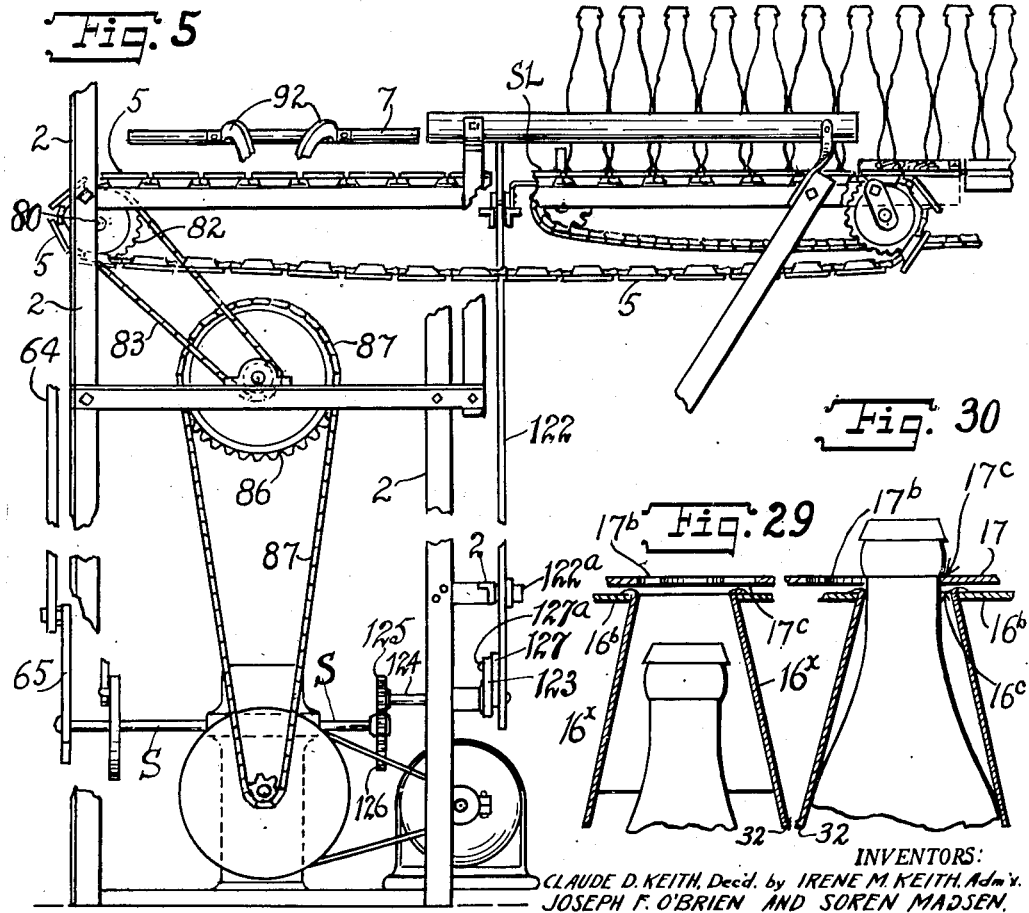

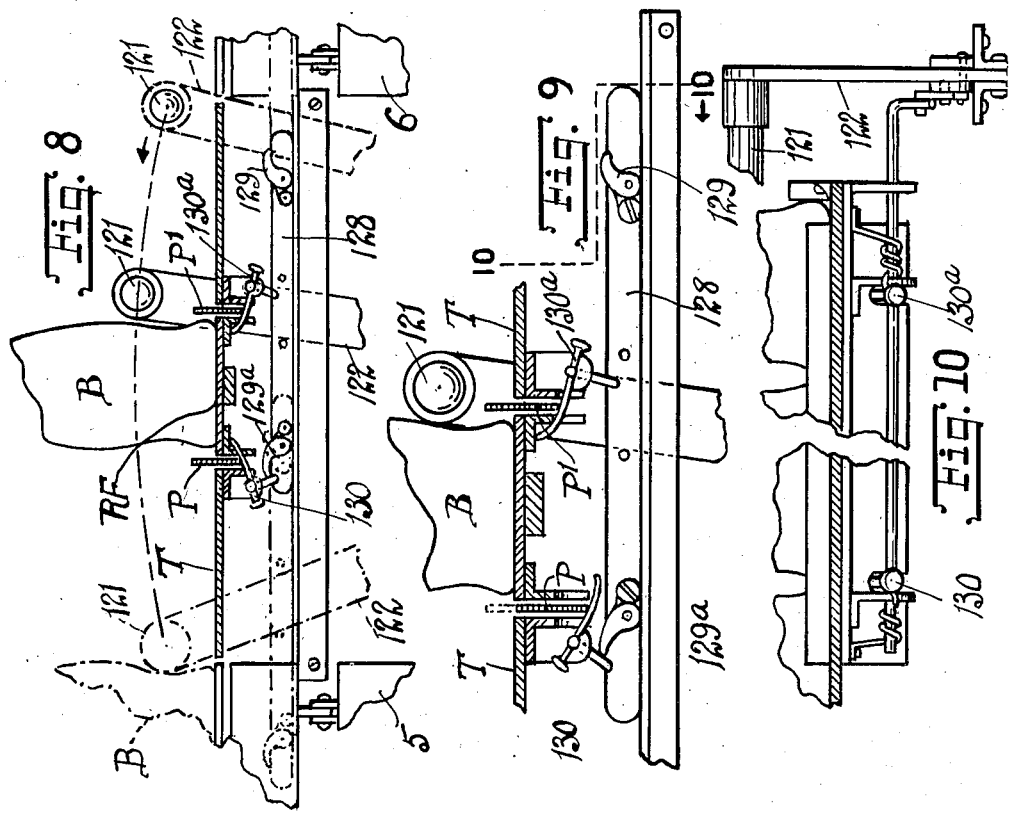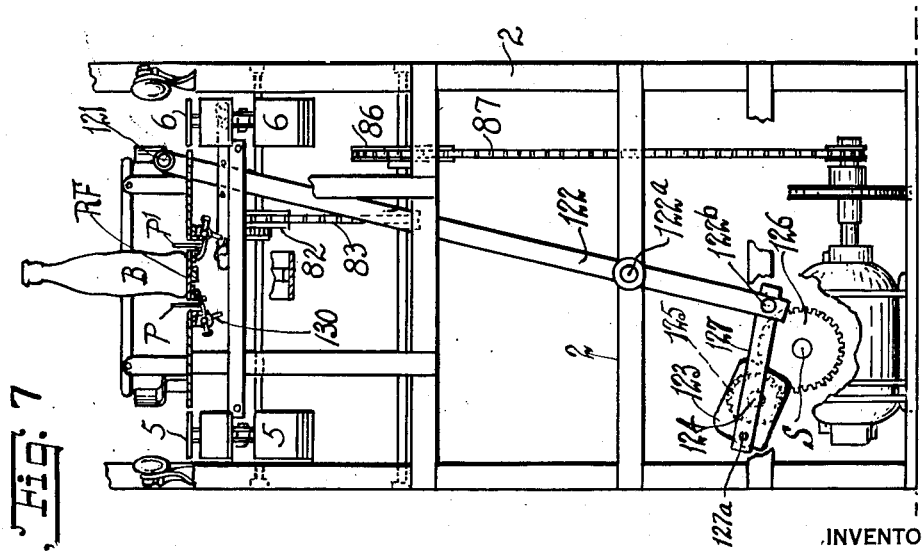

Aug. 29, 1950     C. D. KEITH ET AL     2,520,727
TRANSFER MACHINE FOR BOTTLES AND LIKE ARTICLES
Filed April 19, 1946     9 Sheets-Sheet 7
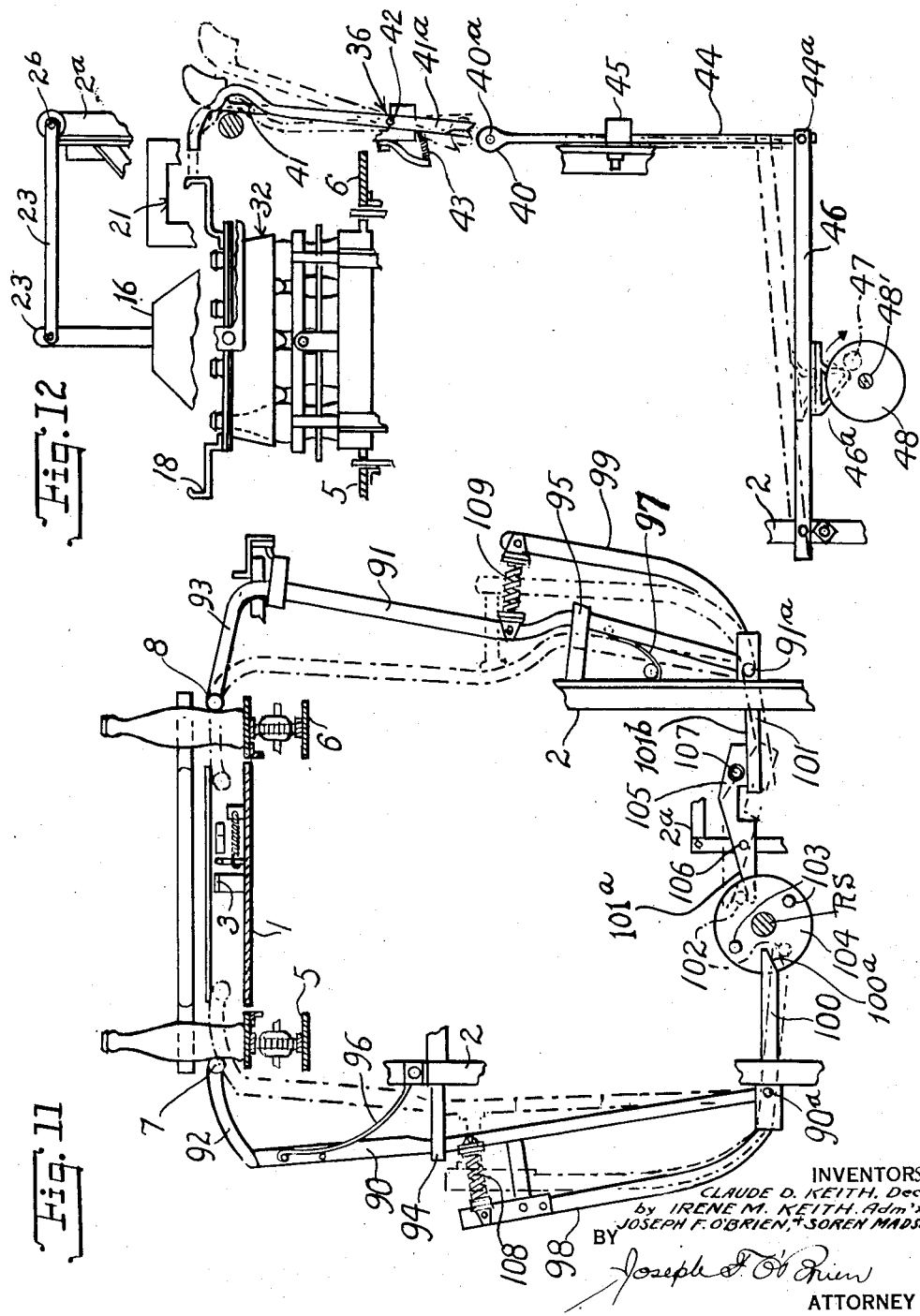

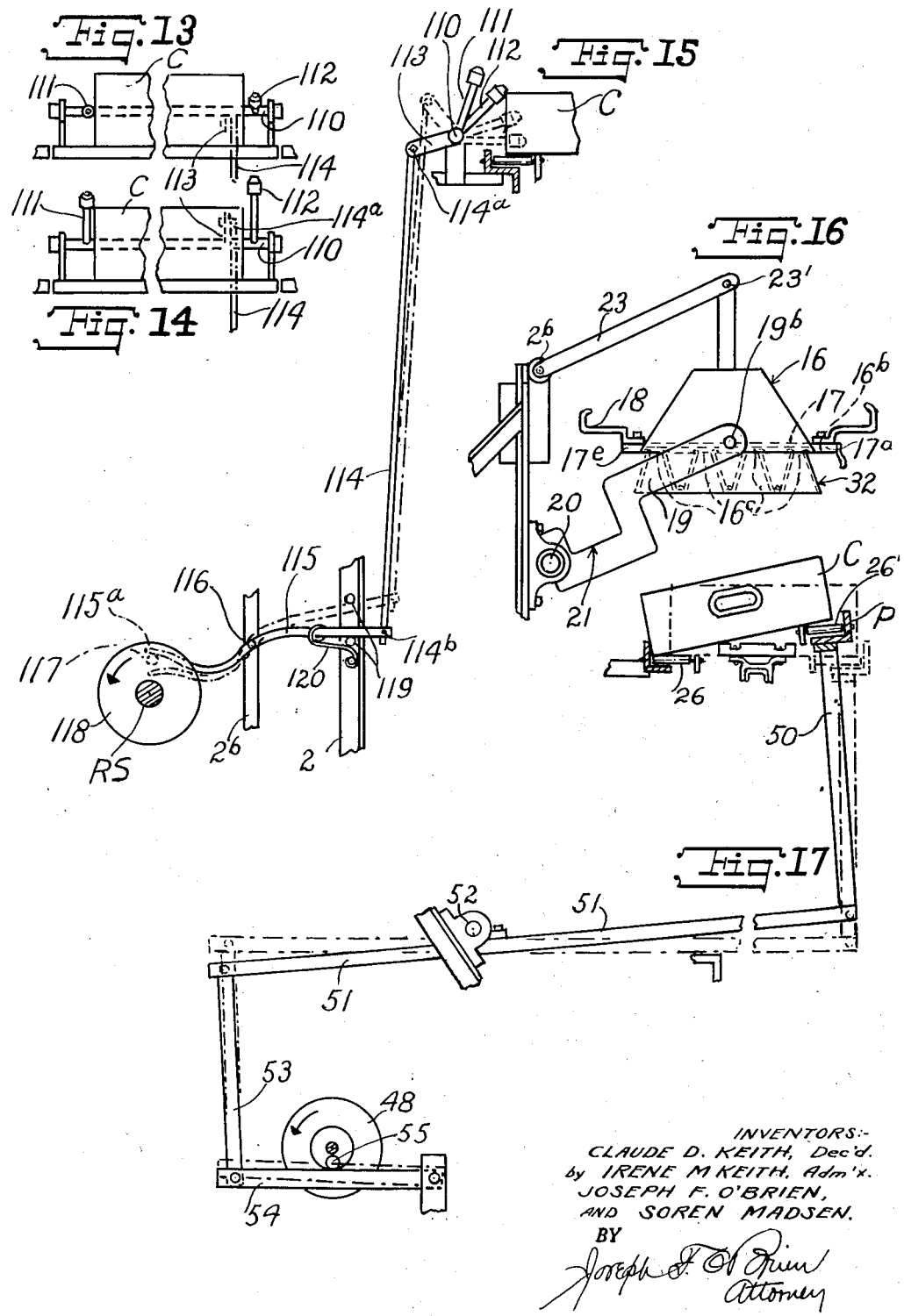

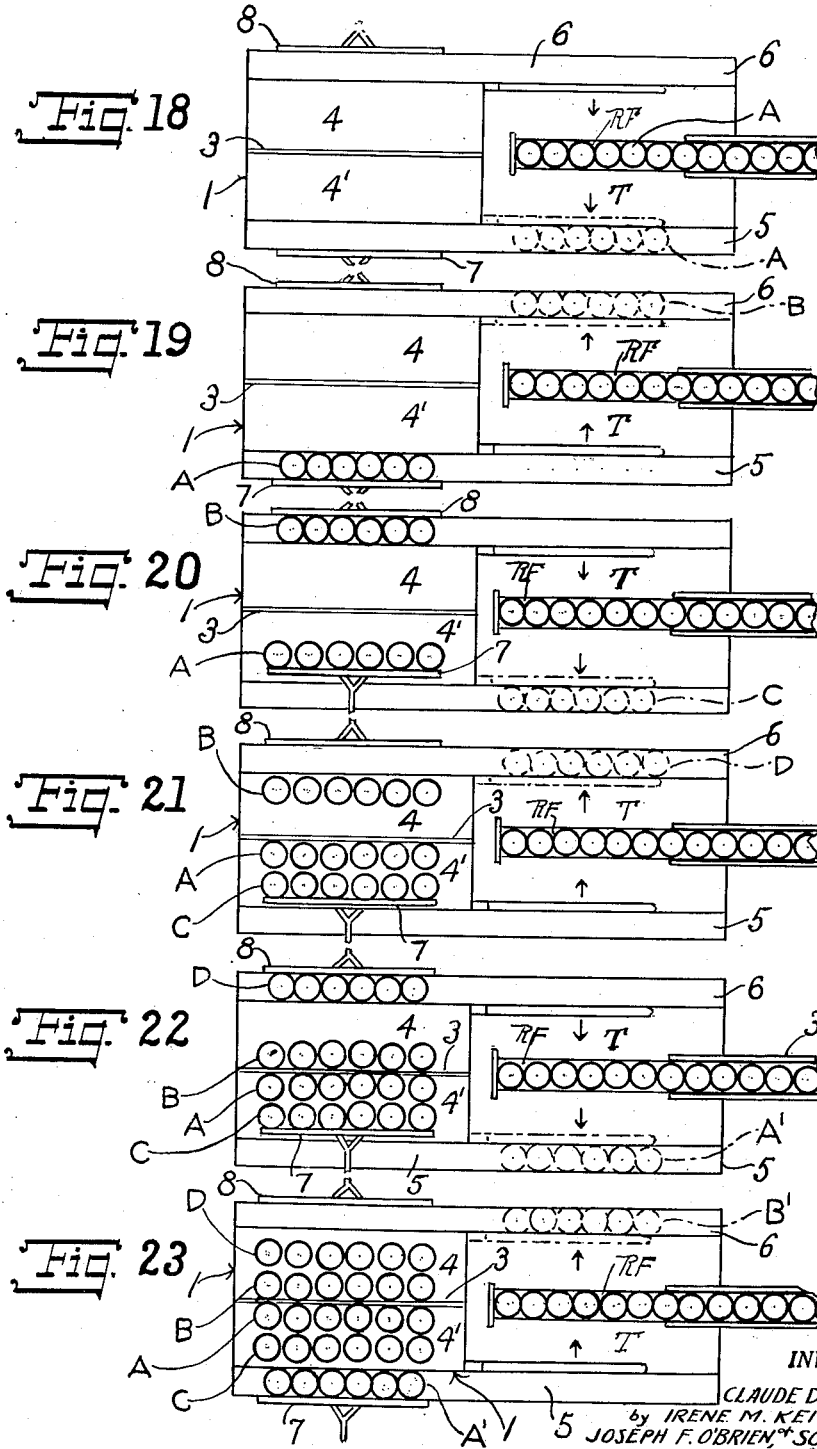

Patented Aug. 29, 1950

2,520,727

UNITED STATES PATENT OFFICE 2,520,727

TRANSFER MACHINE FOR BOTTLES AND LIKE ARTICLES

Claude D. Keith, deceased, late of Lake Mahopac, N. Y., by Irene M. Keith, administratrix, Lake Mahopac, N. Y., and Joseph F. O'Brien, Englewood, and Soren Madsen, Bergenfield, N. J.; said Madsen assignor to said Irene M. Keith as administratrix Application April 19, 1946, Serial No. 663,362

10 Claims. (Cl. 226—14)

1

This invention relates to improvements in transfer machines for bottles and like articles, and constitutes an improvement upon the machine shown and described in our pending application Serial No. 488,932, filed May 28, 1943, now Patent Number 2,431,265, dated Nov. 18, 1947.

The machine of this invention and of the said former application is adapted for use in bottling plants to aggregate large groups, such as case lots, of bottles and to space the same relatively to each other in accordance with the spacing required in a box or case to be loaded or other final repository and then to transfer the aggregated load to such bottle-carrying case or the like, and preferably to insert the bottles in a cellular bottle carrying case.

Cases or boxes conventionally employed for carrying bottles are usually provided with honeycomb partitions which divide the case into cells within which it is necessary to insert and deposit the bottles. Such honey-comb partitions space all the individual bottle-cells from each other both longitudinally and transversely so that, in order to deposit the bottles in such cells, it is necessary to initially space the same both longitudinally and transversely from each other. While bottles have heretofore been conventionally spaced from each other in a direction transverse to the movement thereof by guide-members, a very different problem presents itself in separation both longitudinally and transversely of the direction of movement. Because of the inability to separate the rows from each other longitudinally, such bottles have usually been handled in single rows, but in our said former application we achieved such longitudinal separation by utilizing a table comprising a series of slats, mounting a series of rows of bottles thereon and then moving the slats and bottles mounted thereon rearwardly to space the rows longitudinally from each other. In such an arrangement, it is necessary to rely upon the friction between the bottom of the bottle and the slat upon which a row of bottles is mounted. There is thus a time-loss in the stopping and rearward movement of the bottles. Movement into spaced relationship of the rows of bottles depends on friction, as aforesaid, and is not definitely positive, and at times the bottles are so unevenly spaced as to cause difficulty in the pick-up and further transfer thereof. By our present invention, we avoid the aforesaid time-loss so that the movement through the pick-up or transfer device may be substantially continuous; also we enable a speeding up of the machinery and also positively space longitudinally two of the aggregated rows of bottles from each other, so that our transfer head will be enabled to pick up and transfer a case-lot load of bottles and to insert the same into cellular cases.

One of the objects of this invention is to solve the aforesaid problem and produce the new results hereinabove stated, and to this end we provide improved and more positive bottle-aggregating and spacing mechanism including a stationary support or table and means that will more positively and quickly move the bottles from opposite sides toward the middle thereof into their finally-spaced aggregated position prior to transfer thereof by our transfer head from such aggregating support to the aforesaid carrying case, and preferably to provide an aggregating table and spacing means that will space the middle rows of a case-load from each other by feeding bottles from opposite sides of the aggregating support toward a primary longitudinally-disposed row-spacing element positioned at the middle of the said aggregating support or table and we preferably combine with such opposite-side-to-middle spacing means, dual feed lines for feeding bottles to opposite sides of said aggregating support or table and preferably employ side feed lines or conveyors at opposite sides of said support; then move the bottles at right angles to the initial feeding movement and toward said longitudinally-disposed spacing or separating element at the middle line of the aggregating platform, and finally we transfer by a transfer head the aggregated bottles to a case or other suitable support.

Another object of our invention is, in combination with an aggregating table of the type hereinabove specified, to provide means for successively feeding separated rows of bottles endwise along the opposite side edges of said table combined with means for pushing such rows of such bottles in a movement at right angles to said feed, and during such secondary movement to provide guiding means for positively separating the same into final position for transfer by a transfer head to a carrying case.

Still another object of our invention is to produce a machine that will successively move a series of bottles from a supply line, shift, convey, aggregate and space said series of bottles to provide a case-load thereof and thereafter transfer the same to cases without any grinding contact whatsoever during any part of the operation, and to this end we eliminate all stops or other similar mechanisms that will cause the bottles, during movement in our machine, to move into grinding contact with each other.

Another object of our invention is, in combination with an aggregating table of the type hereinabove specified, to provide means for shifting a row of bottles comprising a unit composed of a plurality or series thereof in contradistinction to the shifting of a single bottle to one or more feeding conveyors for said aggregating table, and thus providing for a multiplied dwell in the feeding of the units to the aggregating table and permitting continuous operation of the feeding units while permitting intermittent engagement thereof by the transfer head.

Another object of our invention is, in an aggregating table of the type hereinabove specified, to provide means for shifting a row of units of bottles alternately to feed conveyors at opposite sides of the aggregating table and thus to speed up the filling movement thereof and also enable a more continuous and speedier supply of bottles to the feed conveyors of the aggregating table.

Still another object of our invention is to provide in combination with an aggregating table of the type specified, a row-shifting mechanism comprising a table or support and a lever shiftable alternately thereon which will shift sidewise a plurality, and preferably a row of six bottles, from a middle feed line or conveyor (which is connected with a bottle-supply line or conveyor) to independent row-feed lines or conveyors connected or communicating with and extending along opposite sides of said aggregating support or table.

Still another object of our invention is to utilize in combination with an aggregating table of the type specified a transfer head oscillatable vertically in the arc of a circle and mounted on an oscillating shaft extending closely adjacent to one side edge of the aggregating table and means for synchronizing the movement thereof with the movement of the bottles on the aggregating table and on the row-shifting support or table.

Still another object of our invention is, in combination with a bottle-aggregating table of the type above specified, to connect rectilinear stub or row-conveyors with opposite sides of said aggregating table, to position a middle feed line between and terminating within said stub row-conveyors, and also to provide means for alternately shifting a row of bottles simultaneously from said middle feed line or conveyor to said stub or row-feeding conveyors.

Still another object of our invention is to utilize for the shifting of said bottles a projecting arm adapted to reciprocate or move alternately in opposite directions across the row-shifting table and the middle feed line or conveyor therein and to engage and shift in each movement a row of bottles from said middle feed line to the stub row-conveyors at opposite sides thereof.

Another object of our invention is to provide on the row-shifting table bottle-guide elements at opposite sides of a middle runway or conveyor and to utilize means connected with said alternately-movable projecting arm for lowering each of these elements alternately upon the approach of the shifting lever to said middle feed line and immediately and automatically raising the same to guide into position another row of bottles to be shifted.

Another object of our invention is to provide a shifting lever adapted to shift a row of bottles, preferably comprising four or six thereof, which will be synchronized with the bottle-pushing mechanism for moving the bottles on the aggregating table and also with the transfer head, and thus to maintain a full supply of bottles to said aggregating table and to said transfer head.

Another object of our invention is, in a feed device of the character specified, to utilize a projecting arm adapted to engage and shift from the middle feed line a given number of bottles to constitute a row thereof on the aggregating table and to provide means for mechanically moving this arm alternately across said middle bottle-feed line or conveyor to shift therefrom a row of bottles at each movement from said main feed line to the two feed lines or conveyors at opposite sides of said main line.

Another object of our invention is to provide, in a device of the character specified, a case-feed conveyor movable intermittently and in synchronization with the movement of the transfer head to feed cases into position beneath said head.

Another object of our invention is, in a device of the character specified, to provide stop and positioning mechanism synchronized with the movement of the boxes to stop and position such boxes in longitudinal position relatively to said head and to provide means for actuating such stop and positioning mechanism to engage and release a case during the intermittent movement thereof by a conveyor belt.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is a view in plan of a machine embodying our invention and showing the aggregating table, transfer head bottle-feed mechanism and bottle-supply line with part of the case-feeding mechanism being broken away and the transfer head being shown in bottle-delivery position over a case;

Fig. 2 is another plan view, partly broken away, of our machine showing the transfer-head in bottle-receiving position over the aggregating table and a case about to be moved to filling position;

Fig. 3 is a front end view, partly in elevation and partly in section, of the machine shown in Figs. 1 and 2 and illustrating the transfer head over the aggregating table, and a case in receiving position;

Fig. 4 is an elevation of the rear end of the machine showing the transfer head in the same position as in Fig. 3 and also showing in elevation the drive mechanism for the transfer head and for the case-conveyor;

Fig. 5 is an illustrative view, in side elevation partly diagrammatic and broken away, showing one of the two bottle-feeding conveyors for the aggregating table, also a part of the bottle-supplying conveyor and of the row-shifting table and conveyor;

Fig. 6 is an illustrative view in perspective of our row-shifting table or support with our alternating row-shifting member and associated parts;

Fig. 7 is an illustrative view in front-end elevation and partly in section on the line 7—7 of Fig. 1 showing our row-shifting table or support with our alternating row-shifting lever and associated parts;

Fig. 8 is an enlarged fragmentary section of our row-shifting table and the alternating row-shifting lever and associated parts shown at the top of Fig. 7;

Fig. 9 is a further enlarged fragmentary view along the same section line as Fig. 8 showing a portion of our row-shifting table and the alternating row-shifting lever about to shift a row of bottles to the left-hand side of the feed line;

Fig. 10 is a similarly-enlarged sectional fragmentary view of the shifting table and associated parts, on the line 10—10 of Fig. 9, looking in the direction of the arrow;

Fig. 11 is a sectional illustrative view, partly broken away and diagrammatic, showing in section substantially on the line 11—11 of Fig. 1 our aggregating table and the bottle pusher mechanisms at opposite sides thereof;

Fig. 12 is an illustrative fragmentary view showing the transfer head and its slidable neck-engaging member in engaging position with the actuating mechanism for said slidable neck-engaging member;

Figs. 13 and 14 are fragmentary illustrative views of case-aligning mechanism embodied in our machine;

Fig. 15 is an illustrative view showing the movement of one of the case-aligning fingers shown in Figs. 13 and 14;

Fig. 16 is an enlarged detail illustrative view showing the transfer head and its supporting means in delivery position;

Fig. 17 is an illustrative view showing the case-tilting mechanism;

Figs. 18 to 23 inclusive are diagrammatic views illustrating the movement of the bottles on to the aggregating table;

Fig. 24 is a fragmentary view in side elevation of the intermittently-movable drive-chain mechanism for the case-conveyor;

Figs. 25 and 26 are detail views of the drive-chain mechanism shown in Fig. 24;

Figs. 27 and 28 are enlarged detail illustrative views at right angles to each other of the operating mechanism for the slidable neck-engaging member of the transfer head shown in Fig. 12;

Figs. 29 and 30 are detail sectional views of the bottle-gripping and guiding mechanism of the transfer head shown in Figs. 1, 2, 3, 12 and 16.

Referring now to these drawings, which illustrate a preferred embodiment of our invention, 1 is a bottle aggregating support or table (see particularly Figs. 1, 2 and 3) suitably supported, as shown, by a skeleton frame 2 of the machine. The aggregating table 1 (which extends horizontally at a suitable level and preferably at substantially the level of the conventional bottle-supply conveyor mechanism from which it receives the bottles to be aggregated thereon) has a longitudinal dimension or length sufficient to receive six bottles and a width dimension adapted to accommodate four bottles, or twenty-four bottles in all, comprising a case load, and is provided with a centrally-disposed longitudinal row-spacing member or dividing partition 3 adapted to separate the area of the table into two aggregating sections 4 and 4' at opposite sides of said row-spacing member 3, and we then provide at each side edge of the aggregating table 1 means, preferably comprising stub or row-conveyors 5 and 6, for feeding into said sections and to opposite sides of said table 1 longitudinal rows of bottles, and we also provide means, and preferably pusher members 7 and 8, for moving these longitudinal rows of bottles at right angles to said feeding movement and to the longitudinal spacing member. During such rectangular movement guide-means is provided on said aggregating table for spacing the bottles of each longitudinal row transversely from each other, and this is accomplished on each of said sections by said movement of rows of bottles in opposite directions toward such longitudinal row-spacing member.

As illustrated, we provide on said table, a series of five transverse pairs of guide-members, 9, 10, 11, 12 and 13. The members at the transverse middle portion of the table are straight and have wedge-shaped ends while the members toward opposite ends have curved outer ends inclining toward the center. This is desirable because when the row of bottles reaches a position opposite these guide members, they are only slightly spaced from each other and the shapes of these guide members cause the bottles to be moved in opposite directions from the middle of the row and pass into channels formed by said guide members and into transversely-spaced relationship to each other. Thus, when the rows are so pushed from each other toward said middle longitudinal row-dividing member, the four bottles constituting each transverse row will be spaced from the next four-bottle transverse row.

We are thus enabled to positively separate and space all of the transverse rows of bottles in a case load and also to separate and position the two longitudinal rows at the middle of the case, and we have found that the spacing of the two outside rows of the case load may readily be accomplished in and by the transfer head in positive manner though such a transfer head could not positively space four rows of bottles in contact with each other.

It is highly desirable in order to enable and to facilitate the picking up by a transfer head, and particularly by our transfer head, of bottles aggregated on an aggregation table to cause the separation and spacing positively of the rows of bottles, so as to enable the same to be arranged in the transfer head in position to be delivered to spaced compartments in a honey-comb case or like compartmented container. While it is relatively easy to positively separate and space rows of bottles in a direction laterally of the movement thereof on an aggregating table, the positive spacing of the same group of bottles in both a longitudinal and transverse direction presented a very different problem.

In our former Patent Number 2,431,265 we solved this difficulty of spacing in both directions by first conventionally arranging the bottles in a suitable series of rows, moving the bottles in the series of rows into contact with each other on a table composed of separable supporting members and then moving the bottle-supporting members rearwardly. This method was found to be not wholly satisfactory because the aggregated bottles were brought into grinding contact on the supporting members, the supply line was intermittently stopped, thus bringing the bottles thereon into grinding contact and also because of the impositive engagement of the supporting members with the bottoms of the bottles, and we, therefore, in our instant invention have changed this system in order to procure a more positive separation and spacing and elimination of stops and grinding contact of the bottles.

In the construction illustrated herein, a series of oppositely-disposed bottle-entrance channels are formed by providing in each of the two sections 4 and 4', the transverse row-spacing bottle-guiding members 9 to 13 which are positioned at substantially right angles to the longitudinally-disposed row-spacing member at the middle of the table 1 and this is combined with the row-conveyors positioned at opposite edges of said table 1 for feeding the bottles longitudinally and parallel to said longitudinal row-spacing member along said side edges, and then providing the pusher members 7 and 8 for moving the said longitudinal rows of bottles inwardly toward each other and into contact with said longitudinal spacing member, which thus spaces the middle rows of bottles longitudinally whereby a load of aggregated bottles is produced which is capable of being transferred.

It is highly desirable to utilize an aggregating table of the type specified in combination with a transfer head of the type shown and described in our earlier application Serial No. 488,932, and to this end we provide a transfer head which is mounted to oscillate in a vertical path from a starting position over and in parallelism with the aggregating table hereinabove described to a bottle-depositing position above a case or other suitable delivery support.

In the preferred embodiment of our invention shown, the said head 16 is mounted to oscillate in a vertical arcuate path on vertically-movable radial supporting-arms 19—19a fixed on an oscillating driven shaft 20 disposed longitudinally of and closely adjacent to one side edge of the aggregating table 1 and the bottle-conveyors 5 and 6 therefor. The said shaft 20 is positioned parallel with said longitudinal row-dividing member 3 and with said row conveyors 5 and 6, and means is provided for oscillating the said shaft to oscillate the transfer head to bottle-receiving and bottle-delivery positions, respectively.

To enable feeding of rows of bottles to said table 1 between said head-oscillating shaft 20 and the edge of the table 1, and also to utilize our transfer head 16 described, the forward member 19 of the vertically-movable radial supporting arms 19—19a, which move in the arc of a circle is provided between its connection with the oscillating shaft 20 and its connection 19b to the transfer head 16 with an upwardly extending U-shaped bottle-entrance bend or notch 21. This bottle entrance notch 21 will allow bottles on the right-hand adjacent conveyor to pass through said bend or notch 21 in the arm 19 in order to enter the space between said transfer head and said shaft. See Figs. 3, 4 and 16.

The transfer head 16, as aforesaid, is movable in a vertical arcuate path from a starting position over the aggregating table 1 to a delivery position over a honey-comb casing or box. On the aggregating table 1, the head is adapted by the movement of the arms to move down vertically over the tops of the articles or bottles and to engage such tops just below the rim heads, which are common to all beverage bottles. This engagement is accomplished by using a mounting and supporting frame 16a embodying a relatively stationary member or plate 16b (see Fig. 1) having bottle-guiding and receiving openings 16c of suitable dimensions and mounting above said plate 16b a shiftable or reciprocable bottle-engaging member or plate 17 also provided with key-shaped bottle-receiving openings 17a, each comprising a round portion 17b registerable with the opening 16c and also having a communicating forked-shaped bottle engaging slot 17c contracted in relation to the receiving openings 16c and 17c and then shifting, by engagement of a suitably-timed actuating member 18 on the machine with oppositely-projecting members 17d—17e, of the said shiftable bottle-engaging member 17.

When the head is loaded with bottles it is then swung or oscillated in a semi-circular vertical path by the radial supporting arms to the opposite side of the oscillating shaft, whereupon the load is deposited or delivered preferably in a honey-comb case or box C supported at such other side of the pivotal shaft 20 on a suitable case conveyor 22. The transfer head 16 is guided during its vertical movement so as to maintain a horizontal position by a pair of articulating levers 23 pivoted at one end at 23' on transverse rod 24' connected to a vertical part 24 of the transfer head 16 and at the opposite end to a frame member. The transfer head 16 is thus mounted by means of a parallelogram of swinging or oscillating arms and is so guided as to cause the bottle-supporting plates of said transfer head 16, during its bottle-carrying vertical movement, to be continuously maintained in horizontal position so that the bottles carried thereby will be held in substantially vertical position while being moved in an arcuate semi-circular path from the aggregating table 1 to the case C.

We have found that a load of bottles may be released from such a transfer head 16 and set down on any suitable support without clatter or clash of any kind, and in some cases it will be desirable merely to move these bottles to a horizontal support, such as a conveyor belt, and to release the bottles thereon. In the preferred form of our invention, however, the bottoms of the bottles are directly inserted into honey-comb chambers or cells of a conventional bottle-carrying wooden case C. These cells are usually square or cubicle in conformation and closely fit the bottles. Such honey-comb chambers are conventional in bottle-carrying cases and make it necessary, as aforesaid, to space the case-load of bottles prior to the depositing thereof in the case, and in the preferred embodiment of our invention the spacing of the bottles is positively accomplished partially on the aggregating table by the means hereinabove described and partly in the transfer head by providing funnel members 16x beneath the bottle-receiving apertures hereinabove specified, and forming these funnel members, as hereinafter more particularly specified, into a rectangular grill 32 adapted simultaneously to engage and space a case-load of bottles that have been initially spaced within the engaging limits of the grill.

We enable the facile insertion of the bottoms of the bottles into the cellular cases by providing intermittently-movable conveyor mechanism for moving the box or case into approximate or substantial longitudinal registration with the transfer head; then providing means for gauging, accurately moving and retaining the case in precise longitudinal registration during the subsequent box-filling operation, and also providing tilting means for causing a successive movement of the several rows of the load into the mouths of the several rows of cells in the case during movement of the load of bottles to releasing position. This successive insertion of the several rows is accomplished by tilting upwardly one edge of the support for the case or box to cause the case or box to assume an inclined position in relation to the bottoms of the bottles. In this position of the case, the bottoms of the outer row of bottles on the carrier will be engaged by outer rear partitions or walls of the case-cells while in inclined position and at an elevation considerably above the final horizontal support. Upon such engagement, the support is lowered to cause the case to move down or be lowered conjointly with the carrier and load of bottles but at a slower rate so that during such downward movement the several rows of bottles in the carrier will successively enter successive rows of cells or compartments. In this way, each of the rows of bottles will be cleanly and efficiently deposited within their compartments without the necessity of any guides or other extraneous means and without any noise or clatter. By this tilting movement, the rear partitions of each cell in each row form guides which engage the heels of the bottles and guide the same into the cells in the case, and if the box is properly positioned on the tilting means or platform no noise will occur.

In the case-filling embodiment of our bottle-transfer handling machine, the empty case C (see Figs. 1 to 4) are moved or fed by suitable conveyor 22 into position over a case-tilting mechanism comprising a tiltable case-support or platform P embodying a pair of case-supporting members 26—26' comprising roller frames positioned in case-receiving position in alignment with conveyor-rail or guide members 27—27' and arranged to extend at opposite sides of the intermittently-movable conveyor drive-chain 28 for moving the cases into position on the platform P and beneath the delivery position of the transfer head. As illustrated, (Figs. 3, 4 and 17) the case-supporting member 26 is supported in fixed position while the case-supporting member 26' is supported and positioned at the upper end of a tilting platform P comprising a vertical tilting frame 50 supported on and extending upwardly from a horizontal tilting frame 51 pivotally mounted on a diagonal member of the skeleton frame 2 of the machine on pivot 52. Said platform is thus swung intermittently about said pivot by suitable cam mechanism hereinafter more particularly specified and is properly timed to synchronize with the movement of the transfer head. The case is thus tilted into a position inclined with relation to the bottom of the bottles in the transfer head 16 while the head-supporting arms 19 are still in inclined position and prior to the completion of the movement thereof.

In the upward movement of the case during its tilting movement, the rear walls of the rear honey-comb chambers will first engage the heels of the bottles and upon further downward movement, the case, which is somewhat loosely supported on the roller frames 26—26', will be moved outwardly by the heels of bottles as they move within the walls of the honey-combs. The successive transverse rows of bottles will be consequently inserted successively in the honey-comb chambers.

In our preferred mechanism for engaging and releasing the tops of the bottles (see Figs. 1, 3, 12, 18, 27 and 28) we preferably combine with the mouting and supporting frame 16ᵃ a grill 32 (see Figs. 3, 12 and 16) composed of funnel members 16ˣ (see particularly Figs. 16 and 29), each having its upper portion connected to the relatively-stationary bottle-receiving and supporting plate 16ᵇ adjacent to the enlarged bottle-receiving apertures therein, so that the funnel members extend downwardly beneath such bottle-receiving apertures and upon movement of the transfer-head downwardly over the bottles, the funnel walls guide such bottles into bottle-receiving openings 16ᶜ of the relatively stationary and shiftable plates 16ᵇ and 17 carried by said head. After insertion of the bottles, the grill 32 retains and holds the bottles during the transfer movement of the said head against excessive swinging or tilting movement relatively to the head and when delivery to a honey-comb case is required said grill maintains the positions of the bottles to enable facile entrance of the same into the honey-combs.

Upon the initial movement of the transfer head downwardly over the tops of a load of bottles, the bottle tops pass upwardly through bottom cavities formed by the funnels of the grill 32 and then through the bottle-receiving openings 16ᶜ and 17ᵇ of the stationary and shiftable members 16ᵇ and 17. The shiftable member or plate 17 is adapted in one position to permit the bottles to rise through and above such member but in the engaging position of the transfer head, the contracted slotted or forked portion is moved or shifted to pass beneath the rim beads of the bottles and thus to lock such bottles to the transfer-head. Assuming, therefore, that it is desired to load a case by such transfer-head, twenty-four of these funnel-surrounded bottle-receiving openings will be provided in the relatively stationary plate and twenty-four similar bottle-receiving openings in the shiftable plate will, in one position, register with the openings and when the plate 17 is shifted, the communicating contracted bayonet or forked slots will extend above the openings in the stationary member to engage the bottle-necks. Upon movement of the head down over the tops of the bottles, therefore, the enlarged bottle-receiving apertures in both the stationary and movable or shiftable members will be in alignment and open to receive the tops of the bottles. Upon the carrier reaching its final position over such bottles, actuating mechanism 36 (see Figs. 12, 27 and 28) is provided for moving or shifting the plate to move the said bayonet-slotted portion of the shiftable member longitudinally beneath the rim-beads and the open ends of said forked slot will be closed by a perimetric portion of the relatively stationary bottle-receiving openings so as to lock such tops of the bottles to the head. When this locking is accomplished, the carrier is then moved vertically in the arc of a circle to its bottle-depositing position, whereupon the actuating mechanism will again be operated to shift the shiftable member in the opposite direction, and thus to completely release the tops of the bottles and deposit them on a suitable horizontal support or within the honey-combs of a box as hereinabove described. In this shifting movement, the forked or bayonet slot slides over the relatively stationary opposite edge portion of the stationary opening and positive release is effected, and the bottles pass downwardly by gravity to the depositing platform or to the honey-comb case.

The mechanism for moving the shiftable member 17 of the transfer head comprises the contact arms 17ᵈ, 17ᵉ, (fixedly connected to and extending beyond opposite edges of the shiftable member 17, so as to permit shifting in opposite directions to engage and release the tops of the bottles as aforesaid), and actuating mechanism for engaging and shifting the same. As shown, the actuating mechanism preferably employed comprises oppositely-movable wedge-spread bars 41, 41ᵃ pivoted at 42 to a portion of the frame 2 of the machine and having a spreading movement upon engagement with a round operating head 40 movable vertically to move a cylindrical pin 40a carried thereby into wedge-separating engagement. This pair of pivoted wedge-actuated bars 41—41a are adapted on said vertical movement of the pin 40a into contact with the lower wedge ends thereof to be spread apart and the upper ends thereof opposite to the wedge portions will engage one of the two ends of the contact arm 17d or 17e to shift the shiftable member 17 to engaging and releasing positions on the bottle necks. Said bars 41, 41a are pivoted near their lower ends and held in non-spread position (see Fig. 27) by a spring 43 and because of the length of the arms of said bars above the pivot, said vertical movement of the head 40 and pin 40a causes the upper ends to move in a wide arcuate path that is substantially horizontal and thus to engage said contact arm extensions of said horizontally-shiftable member 17 without substantial sliding movement therebetween. The mechanism for moving the head vertically comprises a vertically movable lever 44 guided between its ends in guide plates 45 and pivotally connected at its lower end 44a to a horizontal lever 46 which is pivoted at its opposite end to a portion of the frame 2 (Fig. 12) and is provided between its ends with a cam-strap 46a which engages with an eccentric stud 47 on rotation of the disc 48 about its shaft 48' to lift the horizontal levers 46 and the vertical lever 44 to which the head 40 is connected. The movement of said disc and eccentric stud are properly synchronized with the movement of the transfer head, and on each movement will engage one of the opposite ends of contact members of the transfer head to cause alternate engagement and release of a load of bottles.

Our preferred form of mechanism for moving the platform P or case-support and its frame members 50 and 51 to tilt the case, as hereinabove described, comprises (see Figs. 1, 2, 3, 4 and 17), as more specifically shown in our copending application Serial No. 488,932, the extension of one side member of the frame 51 rearwardly of the pivot shaft 52 and the tilting of the frame 51 by operating lever-mechanism connected therewith at the rear end of said lever frame. Said frame is thus tilted, as shown, by the vertical movement (as shown in Figs. 3, 4 and 17) of a vertically-disposed lever 53 pivotally connected at its upper end to said lever-frame and at its lower end pivoted to a horizontal lever 54 which is engaged intermediate ends and depressed by an eccentrically positioned stud 55 on the opposite face of the same cam-disc 48 employed for actuating the spreading and closing movement of the shifting levers. The eccentric stud 55 lowers the horizontal lever 54 which in turn depresses the vertical lever 53 which pulls down the rear end of the lever frame 51 and swings the forward end upwardly to tilt said lever frame 51 on its pivot 52 and to cause the platform P to be elevated and to return to a horizontal position in proper synchronization as aforesaid.

By our invention, we preferably provide means to produce a continuous operation of the flow or movement of bottles from the time they enter the machine till they are deposited in the cases and also to prevent any grinding contact of such bottles during such flow or movement, and for this purpose it is highly desirable to utilize, in a machine of the type specified, in combination with an aggregating table of the type specified, means for feeding bottles in rows or plural units as distinguished from feeding individual or single bottle units, and for this purpose we provide a row-feeding support or table T disposed between the longitudinally-projecting row conveyors 5 and 6 of the aggregating table 1, and provide means for moving across this support or table a plurality of bottles, and preferably an entire row, to be spaced on the aggregating table, and we preferably so move such rows alternately to each of the stub conveyors hereinabove specified.

As illustrated, the row feeding support or table T is provided at its middle portion with a row-feed conveyor which is arranged in registration or alignment with a bottle-supply feed line of conventional type. The row feed conveyor means bottles from the supply line SL along the row-feeding support on table T into proximity to the aggregating table 1 and, in the preferred embodiment of our invention, said row-feed conveyor RF is so arranged that a row of at least six bottles will extend from a terminal member 120 on said table to said supply line, and a projecting arm 121 is mounted at one end to oscillate across said support T for the purpose of moving a row of six bottles alternately from the middle row-feed conveyor RF to the edge row conveyors 5 and 6 extending along the edges of the aggregating and row-feeding tables.

Our preferred mechanism for shifting and guiding the bottles is shown in Figs. 1 and 7 to 10 inclusive. In these views, the shifting arm 121 is mounted upon a vertically swinging lever 122 pivoted intermediate its ends on a pivot 122a fixed on a frame member 2 and positioned in the middle of the machine and beneath the conveyor RF and the lower end of this lever is provided with means for oscillating the same across the middle of the table. As illustrated, a cam member 123 is rotatably mounted on a shaft 124 which is rotated by a gear 125, driven by a large gear 126 fixed on the shaft S. A connecting crank lever 127 is pivoted at 127a to this rotating cam member 123 and has a pivotal connection at 122b which causes the movement of the lower end of the vertically oscillating lever 122 and swings the upper end thereof to move the shifting arm 121 across the row-shifting table T to alternately move or shift a row of bottles from the middle row conveyor RF to the side row conveyors 5 and 6. The lever arm 122 also moves a slide 128 for alternately raising and lowering each of the side partitions P, P' just prior to the movement of a row of bottles across the same by the arm 121. As illustrated, we mount on the slide 128 oppositely-directed spring-pressed pawls 129, 129a which alternately engage and release spring-actuated pivoted cranks 130, 130a which engage the lower ends of the partitions to raise and lower the same.

Our preferred mechanism for oscillating the shaft 20 to move the transfer head comprises (as shown in Fig. 4) a gear 60 fast on said shaft 20 and meshing with a larger gear 61 fast on an independent oscillating shaft 62 oscillated by a crank arm 63 fixed thereto at one end and having its other end pivoted to a vertical transmission rod 64 which is in turn pivoted to a crank arm 65 fast on the gear reduction shaft RS.

Our preferred mechanism for intermittently driving the case-conveyor 22 in synchronization with the movement of the transfer head comprises a vertical transmission member 66 pivoted at its upper end at 66' to the head-oscillating crank arm 63, and having its lower end pivoted at 66a to one end of a lever 67 pivoted intermediate its ends at 68 on the frame 2 of the machine and having at its opposite end an operative connection with a vertically-reciprocating spring-pressed pawl-member 77 movable upwardly along and adapted to engage one of the links of a vertically-disposed intermittently-movable drive-chain 70 mounted on gears 71 and 72 to extend like a vertically-disposed rack between ways 76. The upper gear 71 is fast on a shaft 73 having fixed thereto a drive gear 74 (see Figs. 24 to 26) which drives the case-conveyor chain 22. The drive-chain 70 is thus movable intermittently on each movement of the head-oscillating shafts 62 and 20, said chain being mounted at its lower end on the idler gear 72 mounted on shaft 72ᵃ supported by arm 69, and the pawl member 77 slides along the ways 76 at the side edges of said drive chain 70. Said pawl 77 is thus movable along these ways by the lever 67 (Fig. 4) through a slidable connection between a slide-frame 67ᵃ on said lever 67 and a roller 69ᵃ pivotally mounted on a slide element 77ᵃ movable along the chain and connected with the pawl 77. The lever 67 thus, upon movement about its pivot, moves the pawl member 77 vertically along the ways 76 to click over the links of the chain 70 until it reaches the upper end of the chain, whereupon said spring-pressed pawl member 77 will automatically engage with a link of the chain and upon the opposite movement of the lever 67 will cause an intermittent movement of the gear 71 and a consequent rotation of the shaft 73 and drive gear 74 for the conveyor chain 22 which is thus moved intermittently in synchronization with the movement of the transfer head.

In said drive mechanism for the intermittently movable case-conveyor, it is desirable to operate the mechanism from the operating means for the transfer head and in order accurately to synchronize this drive mechanism with said transfer head, we have provided at the upper part of our intermittently movable drive chain for a suitable dwell in the movement of the case-conveyor sufficient to permit an initial upward movement of the transfer head out of contact with the bottles in a case, so that the transfer head per se will not interfere with a box being moved along the conveyor, which is actuated by said intermittently movable drive chain.

As illustrated, we secure this dwell by providing at the upper end of the chain 70 a cover plate 70ᵃ which prevents engagement of the pawl 77 with the chain 70 during a predetermined downward movement. We found that it is desirable to utilize a cover plate that will cause the pawl to skip at least one link of the chain 70. A dwell in the conveyor movement will thus be provided, as aforesaid, to permit the combined operating mechanism to partially raise the transfer head before movement of the conveyor chain to move one box out of position and to place another box in position beneath such head.

Our preferred mechanism for moving the stub conveyors 5 and 6 comprises, as shown in Figs. 4 and 5, a drive shaft 80 having fast thereon a pair of gears 81 on which the chains of the two stub or row conveyors 5 and 6 are mounted. A gear 82 is fast on shaft 80 and meshes with a chain 83 which engages with a smaller gear 84 fast on a shaft 85 on which is fixedly mounted a large gear 86 meshing with a chain 87, which at its lower end engages with a gear 88 on the shaft S. Obviously power is transmitted through the chains, gears and shaft to rotate the stub or row conveyors continuously at a suitable rate of speed.

Our preferred mechanism for operating the pusher members 7 and 8 causes such members hereinabove specified to be moved alternately or in succession in properly timed relationship to the oscillating movement of the transfer head (see particularly Figs. 3, 4 and 11) and comprises vertically-swinging lever-arms 90—91 pivoted at their lower ends at 90ᵃ, 91ᵃ on the frame 2 of the machine and having at their upper ends inward extensions 92—93 connected, respectively, with the pusher members 7 and 8. The movements of each of the arms are limited by stop members 94—95 and are normally pressed to their outer limit of movement by springs 96—97 which automatically move the pusher members to neutral or disengaged position at the outer limit of movement thereof. The said vertically-swinging levers 90—91 are moved inwardly and preferably alternately or successively by actuating levers 98 and 99 which are also pivoted on pivots 90ᵃ—91ᵃ and have horizontal cam-engaging elements or members 100 and 101 provided with wedge or cam ends 100ᵃ—101ᵃ which are engaged by eccentrically-arranged pairs of studs 102—103 on the disc 104. As shown, the cam-engaging element 101 is formed in a plurality of parts. Thus, we interpose between the horizontal end arm 101ᵇ of the lever 99 and the studs on the disc 104 a subsidiary cam lever 105 pivoted at 106 on a subsidiary frame 2ᵃ and having at its arm-engaging end a roller 107 and at its opposite end the wedge or cam-end 101ᵃ which is engageable with studs 102 on the disc 104, which is mounted, as aforesaid, on the speed reducer shaft RS. The operating levers 98—99 have at their upper ends a resilient connection by springs 108—109 with the vertically swinging levers 90—91, so that upon rotation of the disc 104 the vertically swinging levers 90—91 will be ultimately moved inwardly alternately or successively to resiliently push the levers 90 and 91 which move the members 7 and 8 to push rows of bottles mounted on the row-conveyors 5 and 6 into the various channels of the aggregating table.

In the preferred embodiment of our invention, we preferably provide means for positively aligning cases or boxes longitudinally on the case-conveyors and for this purpose we mount at the side of said case-conveyor an oscillating shaft 110 and provide at opposite ends of this shaft (see Figs. 2, 3, 4 and 13 to 15) a pair of stop fingers 111 and 112, each of which is preferably provided at the outer ends with rollers. The stop fingers 111—112 are fast on and project from a spindle or shaft 110 in angular relationship to each other so that when the shaft is oscillated in one direction and properly timed the forward end of a case moving along the conveyor may be permitted to pass the finger 111 but will be engaged by the other member 112 of the pair of fingers, thus producing a positive stop which engages the forward end of the box, and enabling easy alignment upon the further lowering of the fingers to their box aligning position. These stop fingers are moved intermittently into engagement with the case which is thus held in its proper longitudinal position in relation to the transfer head and are both movable completely out of engagement when a case is filled and is about to be moved, as shown in Fig. 15, by the case conveyor out of its case filling position. The aforesaid intermittent movement is accomplished by providing the shaft 110 with an operating arm 113 and pivotally connecting to the operating arm 113 at outer end 114ª a vertical transmission rod 114 which has its lower end pivoted at 114ᵇ, as more particularly shown in Figs. 4 and 15, to a horizontally disposed power-lever 115 pivoted intermediate its ends at 116 to a subsidiary frame member 2ᵇ and having its free end 115ª provided with a cam-surface engageable by a stud 117 on the disc 118 mounted on the speed-reducer shaft RS. The lever 115 is urged in reverse direction by spring 120, and a pair of movement-limiting stops 119 for the said lever 115 are provided on the frame member 2. It is obvious that, upon the engagement of the stud with its free end, the horizontal lever will be rocked about its pivot 116 and this will in turn move the transmission rod and operating arm 113, thus oscillating the shaft 110 and the fingers 111 and 112. The synchronization of the movement of these fingers is accomplished by mounting the disc 104 on the speed-reducer shaft RS which is also utilized for moving the transfer head and for actuating the intermittent movement of the box conveyor.

In Figs. 18 to 23, we have illustrated diagrammatically the movement of bottles A from the conventional bottle-conveyor or supply line to the aggregating table 1. In these views, Fig. 18 shows in full lines the initial position of a row of bottles A on the row-feed conveyor RF at the middle of the row-feed table T and in dotted lines the position thereof after the first movement of the reciprocating arm 121. In Fig. 19, we have shown in full lines the position of a detached or separated row of bottles after the first movement of the reciprocating arm 121 and the position of another row on the row-feed conveyor RF. Fig. 20 shows the position of the bottles when two rows of bottles have been separated from the bottle conveyor after the second movement of the said reciprocating arm 121; Fig. 21 shows in full lines the position of three detached rows of bottles after the third movement of said reciprocating arm; Fig. 22 shows the positions of the four detached rows of bottles just after the fourth movement of the reciprocating arm and Fig. 23 shows the position of the detached rows of bottles after the fifth movement of the reciprocating arm. The transfer head is synchronized to pick up the four rows of bottles aggregated just as the fifth row A' is being moved by the stub conveyor 5 into position for pushing by the pusher member 7. This pick-up or transfer occurs immediately after the positioning of the fourth row and before succeeding movement which follow along in the same succession shown in Figs. 18 to 23 and cause movement of another load of bottles into position on the aggregating table.

It will be noted that there is an interval between the pushing in of succeeding rows and the interval after the fourth movement enables the head to have its full oscillating movement, but there is no stoppage of the continuous flow of bottles through the machine and no stopping of a succeeding row to permit the former row to be handled or moved out of the way is necessary, and that also this continuous feed is capable of being timed so that there is no grinding between adjacent bottles in the rows being fed to the transfer head.

Having described our invention, we claim:

1. A transfer machine for bottles and like articles embodying, in combination, a stationary bottle-aggregating support, a row-spacing member positioned medially of said support to divide the same into bottle-aggregating sections positioned at opposite sides of said median row-spacing member, a plurality of bottle-guiding and spacing members disposed in said sections at opposite sides of said median row-spacing member to provide channels at approximately right angles thereto for guiding bottles into contact with said median row-spacing member to space rows of bottles extending in one direction and simultaneously to space rows extending in the opposite direction, means for feeding bottles to opposite edges of said support, means for moving the bottles so fed toward said middle spacing member to provide a load of aggregated bottles having two median rows spaced by said median bottle-guiding and spacing member and having all the oppositely-disposed rows spaced by the row-spacing members in said sections, and means for engaging the tops of said aggregated bottles by a transfer head to transfer the same to a bottle-carrying case.

2. A transfer machine for bottles and like articles, embodying, in combination, a stationary bottle-aggregating support, a median row-spacing member positioned medially of said support to divide the same into oppositely-positioned bottle-aggregating sections, a plurality of bottle-guiding and spacing members disposed in said sections at opposite sides of said median row-spacing member to provide channels at approximately right angles thereto for guiding bottles into contact with said median row-spacing member to space rows of bottles extending in one direction and simultaneously to space rows extending in the opposite direction, bottle-feeding conveyor-members at opposite edges of said support moving parallel to said median row-spacing member, means for moving bottles from said opposite-edge conveyors toward said median spacing member to provide a load of aggregated bottles comprising rows spaced in one direction by said median spacing member and spaced in the opposite direction by row-spacing members in said opposite sections, and means for engaging the tops of said aggregated bottles to transfer the same to a bottle-carrying case.

3. A transfer machine for bottles and like articles embodying, in combination, a stationary bottle-aggregating support, a median row-spacing member arranged on said support to divide the same into oppositely-positioned bottle-aggregating sections, a plurality of transverse bottle-guiding and spacing members arranged in said sections at opposite sides of said median row-spacing member to provide channels at approximately right angles thereto for guiding bottles into contact with said median row-spacing member to space median rows from each other and simultaneously to space oppositely-disposed rows from each other, conveyor members at opposite edges of said support moving parallel to said median row-spacing member, pusher members movable across said conveyor members for moving said bottles through said sections into contact with said median row-spacing member to provide a load of aggregated bottles comprising rows spaced medially by said median guiding and spacing members and also spaced in the opposite direction on said support, and means for engaging the tops of said aggregated bottles to transfer the same to a bottle-carrying case.

4. A transfer machine for bottles and like articles embodying, in combination, a stationary bottle-aggregating support, a median row-spacing member arranged on said support to divide the same into oppositely-positioned bottle-aggregating sections, a plurality of bottle-guiding and spacing members arranged at opposite sides of said median row-spacing member to provide channels at approximately right angles thereto for guiding bottles toward said median row-spacing member to space from each other rows extending in one direction and simultaneously to space rows extending in the opposite direction, conveyor members at opposite edges of said support moving parallel to said median row-spacing member, pusher members movable across said row-conveyor members for moving said bottles in opposite directions toward said median row-spacing member to provide a load of aggregated bottles comprising rows spaced by the transverse spacing members in said sections and spaced also at substantially the middle of said support by said median member, a bottle-supply conveyor extending to a position adjacent to said row-conveyor members, means for feeding bottles alternately from said bottle-supply line to said edge-conveyor members and means for transferring said aggregated and spaced load of bottles to a bottle-carrying case.

5. A transfer machine for bottles and like articles embodying, in combination, a stationary bottle-aggregating support, a median row-spacing member arranged at substantially the middle of said support to divide the same into oppositely-positioned bottle-aggregating sections, a plurality of transverse bottle-guiding and spacing members arranged in said sections at opposite sides of said median row-spacing member to provide channels at approximately right angles thereto for guiding bottles toward said median row-spacing member to space rows from each other in one direction, and simultaneously to space rows from each other in the opposite direction, conveyor members at opposite ends of said support moving parallel to said median row-spacing member, pusher members movable across said conveyor members for moving said bottles in opposite directions toward said median row-spacing member to provide a load of aggregated bottles comprising rows spaced by said transverse row-spacing members and spaced in the opposite direction at substantially the middle of said support by said median member, said feed-conveyor-members having feed sections projecting rectilinearly beyond said bottle-aggregating support, a row-shifting support extending intermediate said short conveyors, a projecting arm movable in opposite directions across said row-shifting support to feed rows of bottles alternately to said short conveyor members, and means for transferring said aggregated and spaced load of bottles to a bottle-carrying case.

6. A transfer machine for bottles and like articles embodying, in combination, a stationary bottle-aggregating support, a median row-spacing member arranged at substantially the middle of said support to divide the same into oppositely-positioned bottle-aggregating sections, a plurality of bottle-guiding and spacing members arranged in said sections at opposite sides of said median row-spacing member to provide channels at approximately right angles thereto for guiding bottles toward said median row-spacing member to space rows from each other in one direction and simultaneously to space rows from each other in the opposite direction, conveyor members at opposite ends of said support moving parallel to said median row-spacing member, pusher members movable across said conveyor members for moving said bottles in opposite directions toward said median row-spacing member to provide a load of aggregated bottles comprising rows spaced by the spacing members in said sections and spaced in the opposite direction at substantially the middle of said support by said median member, said feed-conveyor-members having short feed sections projecting rectilinearly beyond said support, a row-shifting support extending intermediate said short conveyors, a projecting arm movable in opposite directions across said row-shifting support to feed bottles alternately to said short conveyor-members, said row-shifting support having depressible guiding partitions at opposite sides thereof, means for normally retaining said depressible partitions in raised guiding position, means on said projecting arm adapted to lower said guiding partitions during each movement across the said row-shifting support and means for transferring said aggregated and spaced load of bottles to a bottle-carrying case.

7. A transfer machine for bottles and like articles embodying, in combination, a stationary bottle-aggregating support, a median row-spacing member positioned at substantially the middle of said support to divide the same into oppositely-positioned bottle-aggregating sections, a plurality of bottle-guiding and spacing members disposed in said sections at opposite sides of said median row-spacing member to provide channels at approximately right angles thereto for guiding bottles into contact with said median row-spacing member to space rows from each other in one direction and simultaneously to space rows from each other in the opposite direction, bottle-feeding conveyor-members at opposite edges of said support moving parallel to said median row-spacing member, means for moving bottles from said opposite-edge conveyors toward said median spacing member to provide a load of aggregated bottles comprising rows spaced by the spacing members in said sections and also spaced by said median row-spacing member, a case-conveyor positioned parallel with said bottle-feeding conveyors and movable intermittently to position a case thereon, a transfer head oscillatable in a vertical arcuate path extending at substantially a right angle to said edge conveyor members and passing over and across one of said edge conveyor members into contact with a load of bottles on said support and into contact with a case on said case-conveyor, means on said transfer head for gripping said load while in contact therewith on said support and for releasing the same when in contact with said case.

8. A transfer machine for bottles and like articles embodying, in combination, a stationary bottle-aggregating support, a median row-spacing member positioned at substantially the middle of said support to divide the same into oppositely-positioned bottle-aggregating sections, a plurality of bottle-guiding and spacing members disposed transversely in said sections at opposite sides of said median row-spacing member to provide channels at approximately right angles thereto for guiding bottles into contact with said median row-spacing member to space rows from each other in one direction and simultaneously to space rows from each other in the opposite direction, a bottle-supply line, a row-shifting support having means for shifting a row of bottles laterally of said supply line, row-conveyor members at opposite edges of said support moving parallel to said median row-spacing member, means for moving bottles from said opposite-edge conveyors toward said median spacing member to provide a load of aggregated bottles comprising rows spaced by said spacing members in said sections and spaced in the opposite direction on said support by said median row-spacing member, a transfer head movable in a vertical arcuate path extending at substantially a right angle to said edge conveyor members and passing over and across one of said row-conveyor members from starting position over said aggregating support into delivery position, a case-conveyor positioned parallel with said bottle-feeding conveyors and movable intermittently to position a case in said delivery position beneath said transfer head in delivery position, means for supporting said transfer head comprising a pair of radially-disposed arcuately-swinging arms movable over one of said row-conveyors, one of said arms being provided with an upwardly disposed bend in alignment with the row-conveyor over which it crosses to permit bottles in upright position to pass into feeding position on said row-conveyor so crossed.

9. A transfer machine for bottles and like articles embodying, in combination, a stationary bottle-aggregating support, a median row-spacing member arranged at substantially the middle of said support to divide the same into oppositely-positioned bottle-aggregating sections, a plurality of bottle-guiding and spacing members arranged at opposite sides of said median row-spacing member to provide channels at approximately right angles thereto for guiding bottles toward said median row-spacing member to space rows extending in one direction and simultaneously to space rows extending in the opposite direction, row-conveyor members at opposite edges of said support moving parallel to said median row-spacing member, pusher members mounted at opposite edges of said aggregating support and movable across said row-conveyor members to move said bottles in opposite directions toward said median row-spacing member and to provide a load of aggregated bottles having rows of bottles spaced in opposite directions, a bottle-supply line extending to a position adjacent to said row conveyor members, a row-shifting support arranged between row-conveyors, means on said row-shifting support for shifting rows of bottles alternately from said row-conveyors, and means for transferring said aggregated and spaced load of bottles to a bottle-carrying case.

10. A transfer machine for bottles and like articles embodying, in combination, a stationary bottle-aggregating support, a median row-spacing member arranged at substantially the middle of said support to divide the same into oppositely-positioned bottle-aggregating sections, a plurality of bottle-guiding and spacing members arranged at opposite sides of said median row-spacing member to provide channels at approximately right angles thereto for guiding bottles toward said median row-spacing member to space rows extending in one direction and simultaneously to space rows extending in the opposite directions, row-conveyor members at opposite edges of said support moving parallel to said median row-spacing member, pusher members mounted at opposite edges of said aggregating support and movable across said row-conveyor members to move said bottles in opposite directions toward said median row-spacing member and to provide a load of aggregated bottles having rows of bottles spaced in opposite directions, a bottle-supply line extending to a position adjacent to said row-conveyor members, a row-shifting support arranged between row-conveyors, means on said row-shifting support for shifting rows of bottles alternately from said row-conveyors, and means for transferring said aggregated and spaced load of bottles to a bottle-carrying case, said pusher members being operatively connected with actuating means for moving the same alternately to enable a continuous flow of bottles to spaced positions on the aggregating support for engagement by the transfer head.

IRENE M. KEITH,
*Administratrix of the Estate of Claude D. Keith, Deceased.*

JOSEPH F. O'BRIEN.
SOREN MADSEN.

No references cited.